(12) United States Patent
Griffiths et al.

(10) Patent No.: US 6,740,172 B1
(45) Date of Patent: May 25, 2004

(54) MODULAR BELT CLEANING APPARATUS

(76) Inventors: Terry Cemlyn Griffiths, 2762 Elberton Rd., Carlton, GA (US) 30627; Braiden Thomas Griffiths, 48 Martin Cemetary Rd., Winterville, GA (US) 30683

( * ) Notice: Subject to any disclaimer, the term of this patent is extended or adjusted under 35 U.S.C. 154(b) by 50 days.

(21) Appl. No.: 10/065,804

(22) Filed: Nov. 21, 2002

Related U.S. Application Data

(63) Continuation-in-part of application No. 60/319,297, filed on Jun. 6, 2002.

(51) Int. Cl.[7] .............................. B08B 1/02; B08B 3/02; B65G 45/22
(52) U.S. Cl. ..................... 134/15; 134/122 R; 134/131; 134/198; 198/495; 474/92
(58) Field of Search ............... 134/15, 122 R, 134/129, 131, 133, 134, 198; 198/495; 474/92, 93, 186

(56) References Cited

U.S. PATENT DOCUMENTS

| | | | |
|---|---|---|---|
| 3,016,235 A | * | 1/1962 | Cnudde ...................... 432/228 |
| 5,524,746 A | * | 6/1996 | Massen et al. ............... 198/443 |
| 5,964,956 A | * | 10/1999 | Straub et al. ................ 134/15 |
| 6,367,613 B1 | * | 4/2002 | Montgomery ............... 198/495 |

* cited by examiner

*Primary Examiner*—Frankie L. Stinson
*Assistant Examiner*—Joseph Perrin
(74) *Attorney, Agent, or Firm*—Ronald E. Smith; Smith & Hopen, P.A.

(57) ABSTRACT

A modular conveyor belt passes over and around at least one sprocket carried on a non-rotating hollow shaft and causes rotation of the sprocket. The sprocket includes a first pair of diametrically opposed sectors and a second pair of diametrically opposed sectors that are laterally staggered in relation to the first pair of sectors. Each sprocket is flanked by a pair of nozzles, each of which produces a fan-shaped spray. The fan-shaped sprays overlap one another across the lateral extent of the belt so that the entire breadth of the belt is cleaned. Adjacent fan-shaped sprays are angled relative to one another so that their respective sprays do not interfere with one another. The staggered sector design ensures that all sections of the belt are exposed to the spray. The nozzles are positioned to clean hinges of the belt when the hinges are open.

11 Claims, 5 Drawing Sheets

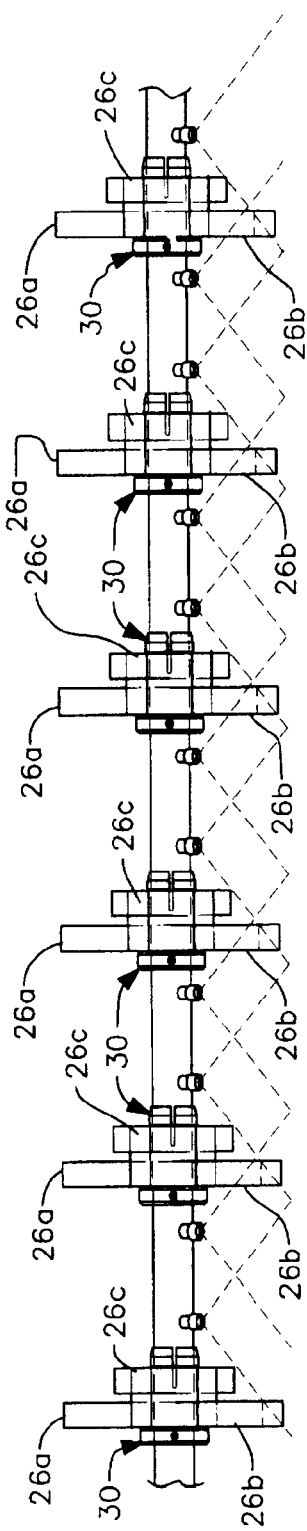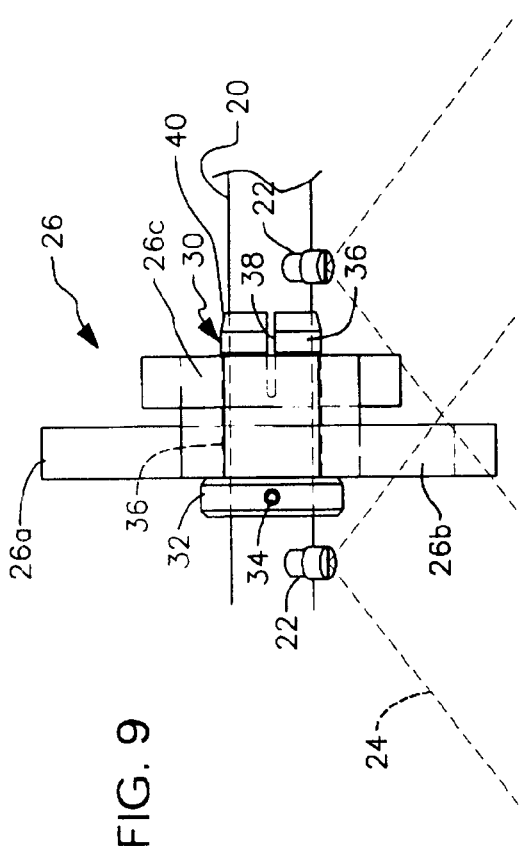

MODULAR BELT CLEANING APPARATUS

CROSS-REFERENCE TO RELATED DISCLOSURE

This application is a continuation-in-part of co-pending United States Provisional Application Ser. No. 60/319,297 filed Jun. 6, 2002.

BACKGROUND OF THE INVENTION

1. Field of the Invention

This invention relates to a machine washing apparatus, and more particularly to an apparatus that washes modular conveyer belts.

2. Description of the Prior Art

Cleaning hinged areas of modular conveyor belts is difficult. Conventional belt washers attempt to clean the belt when the hinged area is closed, therefore preventing water from passing through the hinged area and removing foreign matter.

Accordingly, what is needed is an apparatus that washes a conveyor belt when the belt hinges are open.

The belt hinges are open when the belt is executing a turn. For example, where a belt wraps around a roller the hinges are typically exposed. However, the roller itself contacts the belt and blocks any spray directed at the open hinge.

In view of the prior art considered as a whole at the time the present invention was made, it was not obvious to those of ordinary skill in the conveyor belt art how the hinges could be cleaned when they are in their open configuration.

SUMMARY OF INVENTION

The long-standing but heretofore unfulfilled need for a machine washing apparatus that cleans modular conveyor belts when hinged areas thereof are open is now met by a new, useful and non-obvious invention.

The novel apparatus includes a non-rotating hollow shaft adapted to be mounted to a take-up assembly of a modular conveyor belt. At least one sprocket is rotatably mounted to the hollow shaft in driven relation about the hollow shaft as the modular conveyor belt passes over and around the sprocket or sprockets. Each sprocket has a first pair of sectors that engage the modular conveyor belt at first and second areas thereof and a second pair of sectors that engage the modular conveyor belt at third and fourth areas thereof. The first and second pair of sectors are laterally spaced apart from one another and are laterally staggered as well. "Laterally staggered" means that no two sectors are positioned in lateral juxtaposition to one another.

Thus, a first sector of the first pair of sectors is laterally adjacent an empty space between the first and second sectors of the second pair of sectors, and the same can be said for the second sector of the first pair of sectors. A first sector of the second pair of sectors is laterally adjacent an empty space between the first and second sectors of the first pair of sectors, and the same can be said for the second sector of the second pair of sectors.

The non-rotating hollow shaft has an open, first end adapted for fluid communication with a source of a liquid fluid under pressure and has a closed, second end.

A plurality of nozzle members is mounted on the hollow shaft in laterally spaced relation to one another, and each nozzle member is in open fluid communication with the liquid fluid under pressure. Each nozzle member is also adapted to spray a liquid fluid onto the modular conveyor belt in a fan-shaped spray pattern that impinges upon the modular conveyor belt along a lateral extent thereof. There are a sufficient number of nozzle members to ensure that an entire lateral extent of the modular conveyor belt is sprayed with the liquid fluid.

The unique design of the sprocket ensures that all sections of the belt are exposed to the spray as the belt follows its path of travel.

The modular conveyor belt follows a path of travel away from the take-up assembly, over and around the sprocket or sprockets, and toward said take-up assembly. Each nozzle member has a spray axis angled with respect to a longitudinal axis of the hollow sleeve so that the spray impinges on the belt as the belt travels around the sprocket or sprockets. In a preferred embodiment, the spray axis of each nozzle member is angled at about forty-five degrees (45°) relative to a horizontal plane.

The structure of the modular conveyor belt cleaning apparatus further includes a pair of end plates adapted to be mounted on the take-up assembly in leading relation thereto. The end plates are in laterally spaced relation to one another and each end plate is apertured to receive an end of the hollow shaft. A collar is secured to a preselected end plate of the pair of end plates and to the hollow shaft so that the hollow shaft is held against rotation.

The sprockets may be mounted for rotation directly on the hollow shaft. However, each sprocket might last longer if mounted on a hub that is mounted on the hollow shaft. In a first embodiment, a hub is advantageously secured to the hollow shaft and is held against longitudinal movement on the hollow shaft by a pair of snap rings disposed on opposite ends of the hub. A pair of annular grooves is formed in the hollow shaft to receive the pair of rings. In a second embodiment, a hub having a head and a main body that extends longitudinally therefrom is secured to the hollow shaft. The main body has a tubular configuration for receiving the hollow shaft therewithin.

The head is secured to the hollow sleeve to prevent rotation of the hub with respect to the hollow shaft. The head has a diameter greater than a diameter of the main body and the sprocket is disposed in abutting relation to the head when the sprocket is rotatably mounted on the main body.

In the second embodiment, a sprocket is easily repositionable along an extent of the hollow shaft by sliding the hub from a first position to a second position.

A primary object of the invention is to provide a modular conveyor belt cleaning apparatus that cleans not only the belt but also the hinges between the modular sections of the belt.

A more specific object is to clean the hinges of the belt while the hinges are in their "open" configuration.

Another object is to provide sprocket members that are specially designed so that the sprockets have sections thereof that do not contact the belt so that said sections may be cleaned by a high pressure liquid spray.

Another object is to provide convenient means for mounting sprocket members along the lateral extent of a modular conveyor belt.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 8 is a front elevational view of an embodiment having a large number of sprockets to accommodate a wide conveyor belt; and FIG. 9 is a detailed front elevational view of a sprocket mounted on the hub depicted in FIGS. 6 and 7.

DETAILED DESCRIPTION

Figure 1:
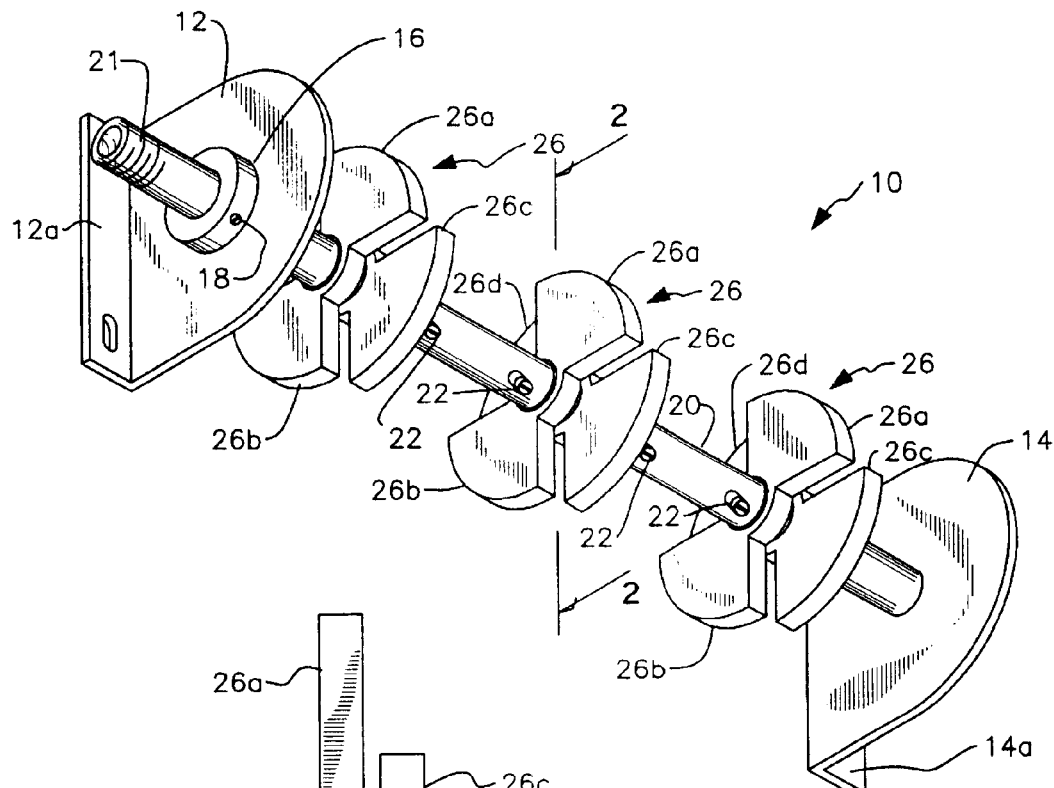
FIG. 1 is a perspective view of a three sprocket embodiment.

Referring now to FIG. 1, it will there be seen that an illustrative embodiment of the invention is denoted as a whole by the reference numeral 10.

Novel assembly 10 includes a pair of laterally spaced apart end plates, denoted 12 and 14. Each end plate is bent to form an outwardly turned flange 12a, 14a to facilitate mounting of assembly 10 to an unillustrated take-up assembly of a conveyor. In the alternative, each flange could be formed separately from its associated end plate and secured thereto by suitable means such as welding. Bolts or other suitable fastening means, not shown, extend through the unnumbered apertures formed in flanges 12a, 14a to engage said take-up assembly.

Collar 16 is welded to end plate 12 so that it does not rotate. In this illustrative embodiment, collar 16 is tapped with three (3) set screws that are equidistantly spaced about the circumference thereof, i.e., the set screws are one hundred twenty degrees (120°) apart from one another. Only one of said three set screws is visible in FIG. 1, and it is denoted 18.

Each end plate 12, 14 is centrally apertured and a hollow sleeve member 20 has opposite ends that extend through said apertures. Set screws 18 prevent rotation of said hollow sleeve member 20 relative to collar 16.

A plurality of fan spray nozzles, collectively denoted 22, are formed in hollow sleeve 20 along the extent thereof in longitudinally or laterally spaced relation to one another. Each nozzle 22 creates a fan-shaped spray pattern 24 (FIG. 3) when water is pumped into the interior of hollow sleeve 20. The number of nozzles is determined by the width of the conveyor to be cleaned.

In the embodiment of FIG. 1, three (3) sprocket assemblies, collectively denoted 26, are mounted for rotation on hollow sleeve 20. The number of sprocket assemblies 26 is also determined by the width of the conveyor to be cleaned.

A modular conveyor belt, not shown, passes over and around sprockets 26 and is the driving force that causes rotation of said sprockets. Each sprocket has four (4) sectors, and said sectors are collectively denoted 26a, 26b, 26c, and 26d. Note that sectors 26a and 26b are formed integrally with one another and are positioned diametrically apart from one another, on opposite sides of hollow shaft 20. The same observation applies to sectors 26c and 26d.

Each sprocket 26 may be made in one or two parts. If made in one part, sectors 26a, 26b, 26c, and 26d are integrally formed with a common hub that rotatably engages hollow sleeve 20. If made in two parts, sectors 26a, 26b are integrally formed with one another and a first sleeve-engaging hub but are formed separately from sectors 26c, 26d which are formed integrally with one another and a second sleeve-engaging hub.

Figure 2:
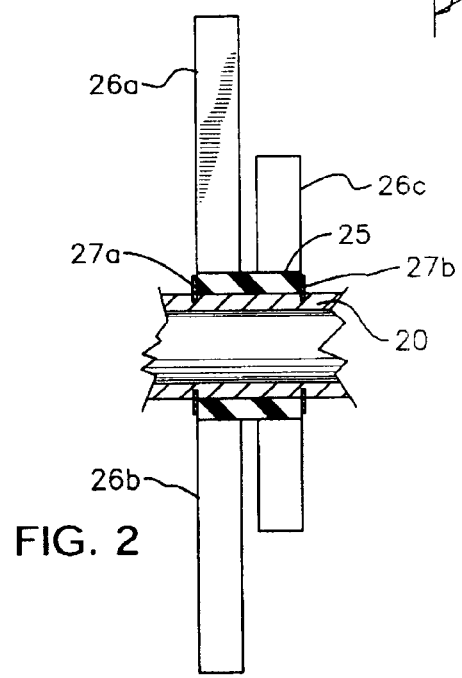
FIG. 2 is a sectional view taken along line 2—2 in FIG. 1.

FIG. 2 depicts a rotatably mounted, sleeve-engaging hub 25. Hub 25 is maintained in place by rings 27a, 27b that snap into place on opposite ends of said hub. Each ring is positioned within an annular groove formed in hollow sleeve 20.

The novel sector-based sprocket design provides sufficient gripping surfaces to prevent slippage of the belt as it rotates about the sprockets, but also exposes the length of the belt between the sectors to a high pressure liquid fluid spray. Moreover, laterally adjacent sectors of each sprocket are staggered so that lengths of the belt respectively engaged by the first and second sectors are exposed to said high pressure liquid fluid when the belt is engaged by the third and fourth sectors and vice versa.

More particularly, each sprocket has a first pair of sectors that engage a conveyor belt at first and second areas of the conveyor belt and a second pair of sectors that engage the conveyor belt at third and fourth areas thereof. The first and second pair of sectors are laterally spaced apart from one another and the first and second pair of sectors are laterally staggered with respect to one another. Accordingly, when the first and second areas of the conveyor belt are engaged by the first pair of sectors, the third and fourth areas of the conveyor belt are not engaged by the second pair of sectors and when the third and fourth areas of the conveyor belt are engaged by the second pair of sectors, the first and second areas of the conveyor belt are not engaged by the first pair of sectors.

Note that in the embodiment of FIG. 1, there are six (6) nozzles 22 because each sprocket 26 is flanked by a nozzle 22. Note further that contiguous fan-shaped spray patterns 24 (FIG. 3) overlap at least to some extent to assure full coverage, i.e., no part of the unillustrated conveyor is missed by the spray. The spray is a high-pressure spray to ensure that all foreign particles are cleaned from the conveyor.

A preselected end of hollow shaft 20 has pipe threads 21 (FIGS. 1 and 3) formed therein to facilitate a water hook-up to said end of said hollow shaft. The opposite end of hollow shaft 20 is tapped and fitted with a drain plug. This enables easy cleaning of nozzles 22.

Figure 3:
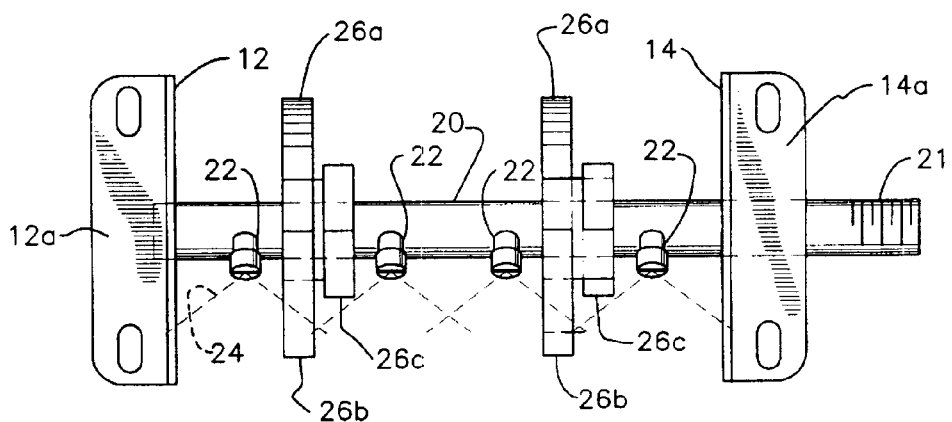
FIG. 3 is a front elevational view of a two sprocket embodiment.

FIG. 3 depicts a two sprocket embodiment having essentially the same structure as the structure of the first embodiment. Only four nozzles 22 are required to flank the two sprockets.

FIG. 3 best depicts how the fan spray patterns 24 overlap with one another to ensure that the entire breadth of the conveyor belt is cleaned.

The modular conveyor belt follows a path of travel away from the take-up assembly, over and around the sprockets, and towards the take-up assembly. As the belt wraps around the sprockets, the hinges of the belt are opened. Accordingly, each nozzle member is angled with respect to a longitudinal axis of the hollow sleeve so that the spray impinges on the hinges of the belt as the belt travels over the sprockets.

Figure 4:
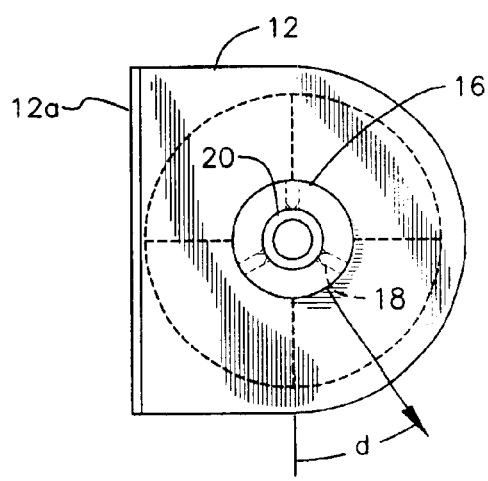
FIG. 4 is an end elevational view.

As perhaps best understood in connection with FIG. 4, the spray axis of each nozzle 22 is positioned at a downward angle of about forty-five degrees (45°) relative to a horizontal plane. Angle α in FIG. 3 is forty-seven and six-tenths degrees (47.6°). The spray axes of contiguous nozzles, however, are not the same so that contiguous spray patterns do not interfere with one another. Thus, a first nozzle might be angled downwardly at forty two degrees (42°), a second nozzle adjacent thereto might be angled downwardly at forty five degrees (45°), and a third nozzle adjacent to the second nozzle might be angled downwardly at forty two degrees (42°). The fan spray pattern of the third nozzle would not interfere with the fan spray pattern of the first nozzle because the angular spacing between said first and third nozzles is sufficient to prevent overlapping of their respective fan spray patterns.

Figure 5A:
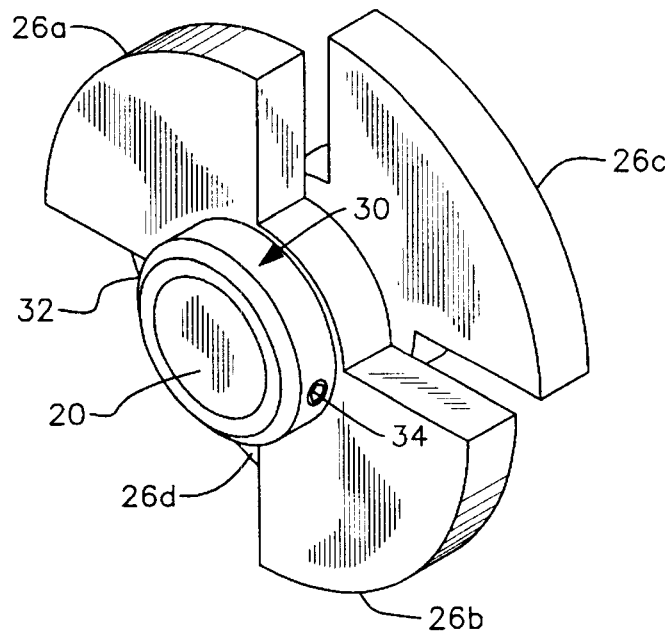
FIG. 5A is a first perspective view of a novel sprocket.
Figure 5B:
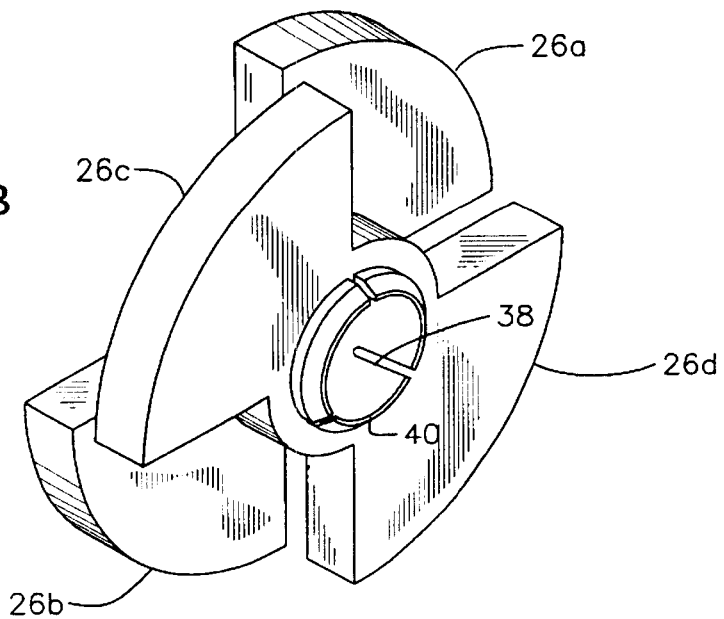
FIG. 5B is a second perspective view of the novel sprocket.

FIG. 5A provides a first perspective view of a sprocket 26 mounted on a non-rotatably-mounted hub 30 and FIG. 5B provides a second perspective view thereof.

Hub 30 is maintained in fixed position relative to hollow sleeve 20 by a plurality of circumferentially spaced set screws 34, only one of which can be seen in FIG. 5A.

Figure 6:
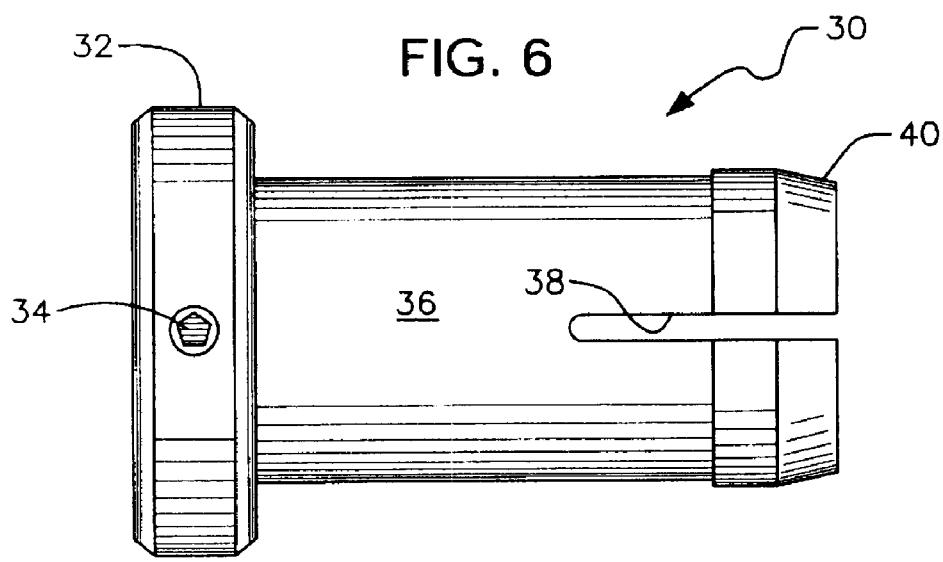
FIG. 6 is a side elevational view of a hub member upon which a sprocket may be mounted.
Figure 7:
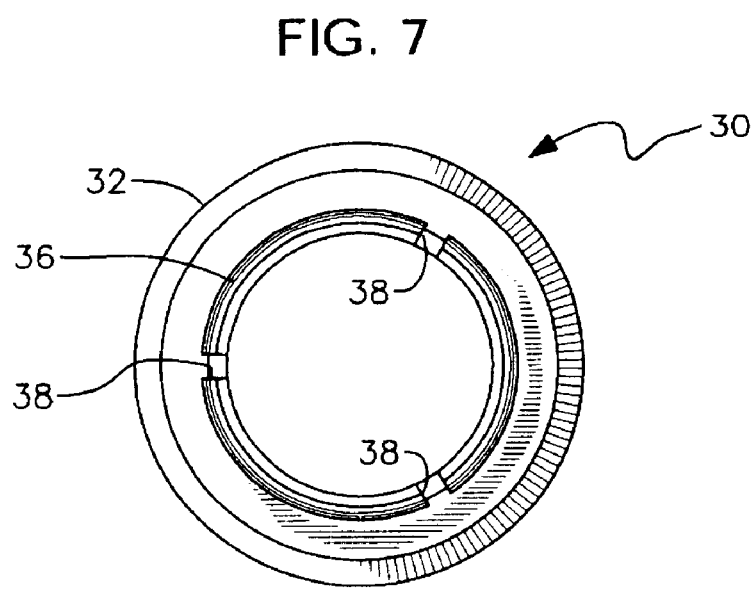
FIG. 7 is an end view of the hub depicted in FIG. 6.

As best understood in connection with FIGS. 6 and 7, hub 30 includes a head 32 having a larger diameter than hub main body 36 that slideably receives hollow sleeve 20. A plurality of longitudinally extending slots, collectively denoted 38, are formed in hub main body 36 in equidistantly and circumferentially spaced relation to one another. The distal end of main body 36 has an annular bevel 40 formed therein to ensure a tight fit of main body 36 to hollow sleeve member 20. Set screws 34, only one of which is depicted as aforesaid, secure head 32 and hence hub 30 to hollow sleeve member 20 so that said hub does not rotate. Sprockets 26 are thus understood to rotate about main body 36 in driven relation to the undepicted conveyor belt.

Hub 30 has utility in an application such as depicted in FIG. 8, but it also has utility where the number of sprockets is small. When hub 30 is used, no snap ring-receiving annular grooves need to be formed in hollow sleeve member 20 as in the embodiment of FIG. 2. Moreover, the position of each sprocket along the length of hollow sleeve member 20 is easily changed just by loosening set screws 34, re-adjusting the position of the sprocket 26 associated therewith, and re-tightening said set screws.

FIG. 9 provides a detailed view of a sprocket 26 mounted for rotation on a hub 30.

Significantly, each fan spray pattern is directed through the open hinge of the unillustrated conveyor belt. The flushing action created by the powerful spray effectively removes foreign matter from between the hinges of the conveyor belt, thereby ensuring that the entire belt is cleaned.

Water under pressure is introduced into hollow sleeve 20 only during times of sanitation clean-up, i.e., the water is not supplied continuously to nozzles 22.

The offsetting of sectors 26a and 26b from sectors 26c, 26d, allows different areas of the conveyor belt to be cleaned as said conveyor belt passes over and around said sprockets. For the same reason, the spacing between sectors 26a and 26b enables the section of the belt between said sectors to be cleaned and the spacing between sectors 26c and 26d serves the same purpose.

In this way, the conveyor belt is cleaned along its entire extent and breadth as it passes over and around sprockets 26 during sanitation clean-up times. The hinges of the belt are sprayed when said hinges are open, thereby ensuring that the sanitation clean-up of the conveyor belt is thorough.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:

1. A method for cleaning modular conveyor belts of the type having hinged areas, comprising:

mounting a non-rotating hollow shaft to a take-up assembly of a modular conveyor belt;

mounting at least one sprocket to said hollow shaft so that said at least one sprocket rotates in driven relation about said hollow shaft as said modular conveyor belt passes over and around said at least one sprocket;

providing said at least one sprocket with a first pair of sectors that engage said modular conveyor belt at first and second areas thereof;

providing said at least one sprocket with a second pair of sectors that engage said modular conveyor belt at third and fourth areas thereof;

spacing said first and second pair of sectors laterally apart from one another;

adapting a first, open end of said non-rotating hollow shaft for fluid communication with a source of a liquid fluid under pressure and closing a second end of said hollow shaft;

mounting a plurality of nozzle members on said hollow shaft in laterally spaced relation to one another so that each nozzle member of said plurality of nozzle members is in open fluid communication with said liquid fluid under pressure;

adapting each nozzle member of said plurality of nozzle members to spray a liquid fluid onto said modular conveyor belt;

adapting each nozzle member of said plurality of nozzle members to spray said liquid fluid in a fan-shaped spray pattern that impinges upon said modular conveyor belt along a lateral extent thereof; and providing a sufficient number of nozzle members to ensure that an entire lateral extent of said modular conveyor belt is sprayed with said liquid fluid.

2. The method of claim 1, further comprising the step of positioning each nozzle so that a spray axis of each nozzle is disposed at an angle relative to a horizontal plane so that said spray impinges on said belt as said belt travels around said at least one sprocket.

3. The method of claim 2, wherein the spray axis of each nozzle member is angled at about forty-five degrees (45°) relative to a horizontal plane.

4. The method of claim 1, further comprising the steps of:

mounting a pair of end plates on said take-up assembly so that said end plates are in laterally spaced relation to one another;

forming an aperture in each end plate of said pair of end plates to receive an end of said hollow shaft; and securing a collar to a preselected end plate of said pair of end plates and to said hollow shaft so that said hollow shaft is held against rotation.

5. An apparatus for cleaning modular conveyor belts of the type having hinged areas, comprising:

a non-rotating hollow shaft adapted to be mounted to a take-up assembly of a modular conveyor belt;

said non-rotating hollow shaft having an open, first end adapted for fluid communication with a source of a liquid fluid under pressure and having a closed, second end;

at least one sprocket rotatably mounted to said hollow shaft, said at least one sprocket rotating in driven relation about said hollow shaft as said modular conveyor belt passes over and around said at least one sprocket;

said at least one sprocket having a first pair of sectors that engage said modular conveyor belt at first and second areas thereof;

said at least one sprocket having a second pair of sectors that engage said modular conveyor belt at third and fourth areas thereof;

said first and second pair of sectors being laterally spaced apart from one another;

said first and second pair of sectors being laterally staggered with respect to one another;

a plurality of nozzle members mounted on said hollow shaft in laterally spaced relation to one another, each nozzle member of said plurality of nozzle members being in open fluid communication with said liquid fluid under pressure;

each nozzle member of said plurality of nozzle members adapted to spray a liquid fluid onto said modular conveyor belt; and each nozzle member of said plurality of nozzle members adapted to spray said liquid fluid in a fan-shaped spray pattern that impinges upon said modular conveyor belt along a lateral extent thereof, there being a sufficient number of nozzle members to ensure that an entire lateral extent of said modular conveyor belt is sprayed with said liquid fluid.

6. The apparatus of claim 5, wherein said modular conveyor belt follows a path of travel away from said take-up assembly, over and around said at least one sprocket, and toward said take-up assembly, each nozzle member of said plurality of nozzle members having a spray axis angled with respect to a longitudinal axis of said hollow sleeve so that said spray impinges on said belt as said belt travels around said at least one sprocket.

7. The apparatus of claim 6, wherein the spray axis of each nozzle member is angled at about forty-five degrees (45°) relative to a horizontal plane.

8. The apparatus of claim 5, further comprising:

a pair of end plates adapted to be mounted on said take-up assembly so that said end plates are in laterally spaced relation to one another;

each end plate of said pair of end plates being apertured to receive an end of said hollow shaft; and a collar secured to a preselected end plate of said pair of end plates and to said hollow shaft so that said hollow shaft is held against rotation.

9. The apparatus of claim 5, further comprising:

a hub secured to said hollow shaft in non-rotating relation thereto;

said hub being held against longitudinal movement on said hollow shaft by a pair of rings disposed on opposite ends of said hub; and a pair of annular grooves formed in said hollow shaft to receive said pair of rings.

10. The apparatus of claim 5, further comprising:

a hub secured to said hollow shaft in non-rotating relation thereto;

said hub having a head and a main body that extends longitudinally therefrom;

said main body having a tubular configuration for receiving said hollow shaft therewithin;

said head secured to said hollow sleeve to prevent rotation of said hub with respect to said hollow shaft;

said head having a diameter greater than a diameter of said main body and said sprocket being disposed in abutting relation to said head when said sprocket is rotatably mounted on said main body;

whereby a sprocket is repositionable along an extent of said hollow shaft by sliding said hub from a first position to a second position.

11. A sprocket adapted to be mounted for rotation about a shaft, comprising:

said sprocket adapted to be connected in driven relation to a rotating conveyor belt, said sprocket having a first pair of sectors that engage said conveyor belt at first and second areas of said conveyor belt;

said sprocket having a second pair of sectors that engage said conveyor belt at third and fourth areas thereof;

said first and second pair of sectors being laterally spaced apart from one another; and said first and second pair of sectors being laterally staggered with respect to one another;

whereby when said first and second areas of said conveyor belt are engaged by said first pair of sectors, said third and fourth areas of said conveyor belt are not engaged by said second pair of sectors; and whereby when said third and fourth areas of said conveyor belt are engaged by said second pair of sectors, said first and second areas of said conveyor belt are not engaged by said first pair of sectors.

* * * * *